3,217,848
FREE WHEEL TRANSMISSION
Pierre Tout-Kowsky, Paris, and Jean-François Vernet, Fontenay-aux-Oses, Seine, France
Filed Nov. 19, 1962, Ser. No. 255,709
Claims priority, application France, Dec. 8, 1961, 881,336
2 Claims. (Cl. 192—41)
(Filed under Rule 47(a) and 35 U.S.C. 116)

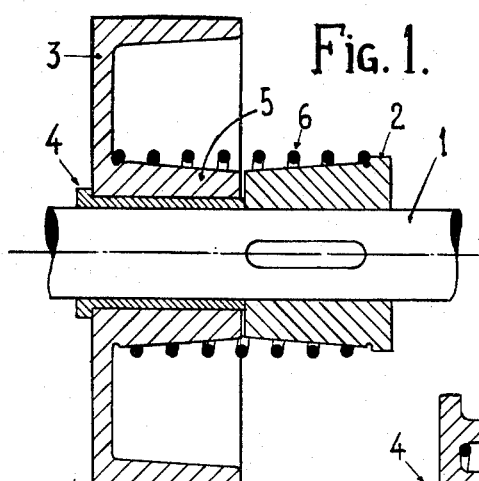
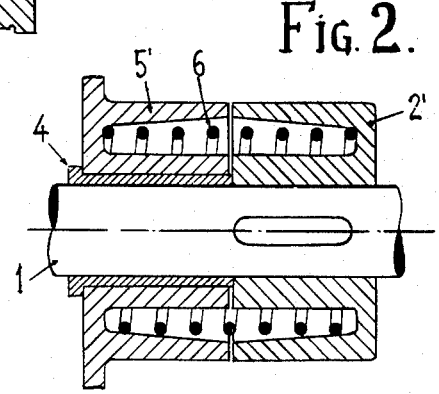
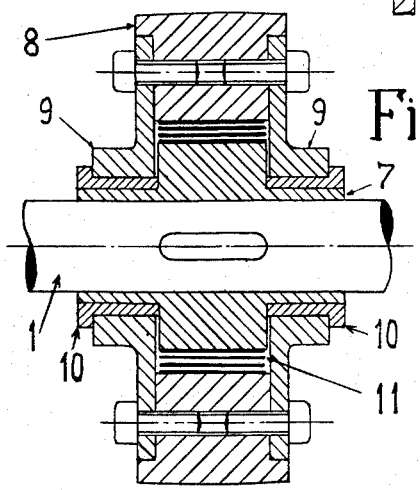
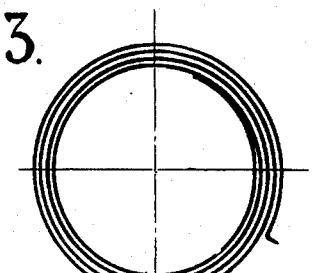
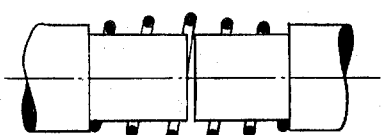

This invention relates to free wheel transmission and refers more particularly to a free wheel with a spring selector.

In prior art systems of apparently simple construction, power is transmitted by friction between the wheels and the two elements with which they are in contact, whereby the angle of surfaces serving as wedges or cams must not exceed twice the angle of friction. Since the angle now in general use is 6°, the transmitted power amounts to only about ten percent of the radially exerted power. The result is that it is necessary to use pressures which may be ten times higher than the useful loads, so that steels of high mechanical resistance are required for the manufacture. Furthermore, the construction of a wheel of this type requires a precision in machining and finishing which is greater than generally employed in mechanical work of similar nature.

An object of the present invention is to eliminate drawbacks of prior art constructions.

Other objects will become apparent in the course of the following specification.

In accomplishing the objects of the present invention it was found desirable to provide a free wheel which when forming a part of a mechanical transmission, will permit a rotary unidirectional movement, i.e. movement in one direction only, the drive taking place by means of springs of various types and forms which act tangentially to the direction of their windings.

Thus in accordance with the present invention there is provided a free wheel with a spring selector the action of which is exerted tangentially and not radially. This free wheel may be constructed in accordance with standard mechanical practices. It provides a progressive connection between a driving member and a driven member in an automatic manner without the application of any other force from the outside.

The invention will appear more clearly from the following detailed description when taken in connection with the accompanying drawing showing by way of example only preferred embodiments of the inventive idea.

In the drawing:

FIGURE 1 shows in section a wheel having a helical spring and constructed in accordance with the principles of the present invention.

FIGURE 2 is a section through a somewhat differently constructed wheel.

FIGURE 3 shows in section a wheel having a spiral spring.

FIGURE 3a illustrates the spring shown in FIG. 3.

FIGURE 4 illustrates partly in side view and partly in section a different embodiment illustrating a specific application.

The embodiment of the invention shown in FIGURE 1 of the drawing includes a driving shaft 1 carrying a drum 2 which is keyed thereon. The shaft 1 also carries a pulley 3 which can rotate freely upon the shaft 1 due to the provision of an intermediate ring or bearing 4 mounted upon the shaft 1 and supporting the pulley 3. The pulley 3 includes a hub 5 located symmetrically in relation to the drum 2, whereby the hub 5 and the drum 2 constitute continuations of one another. Major portions of the drum 2 and of the hub 5 are slightly conical in shape and these conical portions join cylindrical end portions located at opposite ends of the drum and the hub.

A helical coaxial spring 6 surrounds freely the drum 2 as well as the hub 5 in such manner that when at rest its inner diameter is equal to the diameter of the cylindrical portions of the drum 2 and the hub 5, so as to provide a driving connection for the end windings of the helical spring.

Thus an important feature of the present invention is that the helical spring 6, including its ends, is entirely free and is not connected in any manner, rigid or resilient, with either the drum 2 or the hub 5.

In operation, let it be assumed that the shaft 1 rotates in a direction opposite to the direction of the windings of the spring 6. Then the light frictional contact of the first turns of the helical spring 6 with the drum 2 will result in a completely automatic radial contraction of the following turns. The drive is transmitted actively and tangentially from the shaft 1 to the pulley 3, since the resulting tensional force increases exponentially along the spring 6 beginning at the location wherein the spring 6 is freely hooked onto the drum 2, while the tensional force decreases exponentially toward the location wherein the spring 6 is hooked onto the hub 5. The greatest tension is located in the middle, namely in the plane extending between the drum 2 and the hub 5.

On the other hand, if the shaft 1 rotates in the same direction as the direction of the windings of the spring 6, the turns of the spring 6 will have the tendency to loosen under the action of the light frictional contact of the first turns with the drum. Then the shaft 1 will be able to continue to rotate freely in this direction without involving the pulley 3 in this movement.

FIGURE 2 shows a construction which is somewhat different from that illustrated in FIG. 1. The construction of FIG. 2 has the same driving shaft 1 and the same spring 6. However, the spring 6 is located within two inner bore chambers, one of which is provided in the keyed drum 2' while the other is formed in the pulley 5'; the two chambers are disposed symmetrically so that one constitutes a continuation of the other. The recesses have outer conical surfaces which are directed outwardly, extending in a direction opposite to that shown in FIG. 1, as well as cylindrical outer end surfaces contacted by the end turns of the spring 6.

The operation of this device is similar to that previously described. This construction is particularly advantageous when the shaft is rotated at great speeds. In this construction also the ends of the spring are entirely free.

Another embodiment illustrated in FIGURES 3 and 3a pertains to a free wheel provided with a spiral spring selector. The device comprises a driving shaft 1 carrying a drum 7 which is keyed thereon, and a pulley 8 having centered opposed flanges 9. The pulley can rotate freely upon the shaft 1 due to the provision of two intermediate rings or bearings 10 mounted upon extensions of the drum 7 and supporting the flanges 9. A spiral spring 11 freely encloses the drum 7 while its outer end fits into a groove in the pulley 8.

In operation, if the driving shaft 1 is rotated in a direction opposed to the winding direction of the spiral spring, light friction exerted upon the first turn of the spring which is in direct contact with the drum 7, will provide a driving connection. The second turn of the spring and the following turns will contract radially providing a progressive and automatic increase in contact engagement, whereby a tangential force is transmitted to the pulley 8.

On the other hand, if the driving shaft 1 is rotated in the same direction as the winding direction of the spiral spring 11, the first turn of the spring will have the tendency to expand and to free itself from the drum 7. Thus, no turn of the spring 11 will take part in the rotation of the shaft 1, so that the drive will not be transmitted to the pulley 8.

FIGURE 4 shows that for special purposes it is possible to use a bead-shaped cylindrical spring 12 which is not precisely helical. This spring, the ends of which are free but are in frictional contact with the two shafts, provides a direct connection between a driving shaft and a driven shaft, the two shafts being of the same diameter and one constituting an extension of the other. The spring 12 functions in the same manner as the spring 6 shown in FIGURE 1.

It is apparent that the examples described above have been given solely by way of illustration and not by way of limitation and that they are subject to many variations and modifications within the scope of the present invention. For example, the construction of FIG. 4 wherein the driving shaft actuates a driven shaft directly, may be varied by providing that the ends of the shafts terminate in inversely conical surfaces. Then a helical spring may be used to enclose freely the two shafts.

It is even possible to use double helical springs the pitch of which is also doubled.

In general the outline of the spring in its untensioned state may vary and be determined by the specific structural problem or function involved. The outlines of the drum and hub may be adapted to that of the spring; they may be cylindrical or of other suitable shape.

What is claimed is:

1. A free wheel transmission, comprising in combination, a driving shaft, a drum keyed upon said driving shaft, a pulley having a hub rotatably mounted upon said shaft, said drum and said pulley having continuing inner recesses, said recesses having outer surfaces comprising cylindrical end portions and outwardly directed conical portions, and a helical spring located in both said recesses and having end turns contacting said cylindrical end portions.

2. A free wheel transmission, comprising in combination, a driving shaft, a drum keyed upon said driving shaft, a pulley rotatably mounted upon said drum and a spiral spring having an inner end enclosing said drum and an outer end located in a groove formed in said pulley.

References Cited by the Examiner
UNITED STATES PATENTS

| | | |
|---|---|---|
| 2,004,650 | 6/1935 | Collyear et al. |
| 2,061,827 | 11/1936 | Brooks. |
| 2,242,379 | 5/1941 | Wahl. |
| 2,618,137 | 11/1952 | White. |
| 2,866,349 | 12/1958 | Heckethorn _____ 74—217 X |
| 2,878,914 | 3/1959 | Worst _____ 192—41 |
| 2,885,896 | 5/1959 | Hungerford et al. _____ 74—217 |
| 2,939,561 | 6/1960 | Rudisch. |
| 3,000,481 | 9/1961 | Tomko _____ 192—41 |
| 3,033,336 | 5/1962 | Kinsman. |

DON A. WAITE, *Primary Examiner.*

MILTON KAUFMAN, *Examiner.*